United States Patent
Bai et al.

(10) Patent No.: US 12,340,560 B2
(45) Date of Patent: Jun. 24, 2025

(54) SYSTEMS AND METHODS FOR GENERATING A CLASSIFICATION MODEL USING PRIMARY AND SECONDARY LOSS FUNCTIONS

(71) Applicant: Lemon Inc., Grand Cayman (KY)

(72) Inventors: Song Bai, Singapore (SG); Yujun Shi, Singapore (SG)

(73) Assignee: Lemon Inc., Grand Cayman (KY)

( * ) Notice: Subject to any disclaimer, the term of this patent is extended or adjusted under 35 U.S.C. 154(b) by 316 days.

(21) Appl. No.: 17/949,078

(22) Filed: Sep. 20, 2022

(65) Prior Publication Data

US 2024/0104894 A1    Mar. 28, 2024

(51) Int. Cl.
*G06V 10/764* (2022.01)
*G06V 10/72* (2022.01)
*G06V 10/771* (2022.01)

(52) U.S. Cl.
CPC ............ *G06V 10/764* (2022.01); *G06V 10/72* (2022.01); *G06V 10/771* (2022.01)

(58) Field of Classification Search
None
See application file for complete search history.

(56) References Cited

U.S. PATENT DOCUMENTS

| | | | | |
|---|---|---|---|---|
| 2008/0114564 | A1* | 5/2008 | Ihara | G06F 16/35 702/158 |
| 2020/0302230 | A1* | 9/2020 | Chang | G06F 18/214 |
| 2024/0104894 | A1* | 3/2024 | Bai | G06V 10/764 |

OTHER PUBLICATIONS

Mittal et al.; "Essentials for Class Incremental Learning"; IEEE/CVF Conf. on Computer Vision and Pattern Recognition; 2021; 12 pages.
Douillard et al.; "PODNet: Pooled Outputs Distillation for Small-Tasks Incremental Learning"; European Conf. on Computer Vision; 2020; 19 pages.
Hou et al.; "Learning a Unified Classifier Incrementally via Rebalancing"; IEEE/CVF Conf. on Computer Vision and Pattern Recognition; 2019; p. 831-839.

* cited by examiner

*Primary Examiner* — Tahmina N Ansari
(74) *Attorney, Agent, or Firm* — BakerHostetler

(57) ABSTRACT

A method is proposed for sample processing. A first group of data are received, here data in the first group of data comprises a sample and a classification of the sample, and the classification belonging to a first group of classifications in a plurality of classifications associated with the data. A plurality of data with the classification are selected from the first group of data. A first and a second loss function are determined for training a classification model that represents an association relationship between samples and classifications of the samples based on a plurality of samples comprised in the plurality of data and the classification, the first and second loss functions represent classification accuracy and a feature distribution for the classification model. The classification model is trained based on the first and second loss functions. Therefore, the accuracy of the classification model may be increased.

20 Claims, 8 Drawing Sheets

| Method | CIFAR100 (B=50) | | | ImageNet100 (B=50) | | | ImageNet (B=100) | |
|---|---|---|---|---|---|---|---|---|
| | S=10 | 5 | 2 | 10 | 5 | 2 | 100 | 50 |
| LwF | 53.59±0.51 | 48.66±0.58 | 45.56±0.28 | 53.62 | 47.64 | 44.32 | 40.86±0.13 | 27.72±0.12 |
| iCaRL | 60.82±0.03 | 53.74±0.25 | 47.86±0.41 | 65.44 | 59.88 | 52.97 | 49.56±0.09 | 42.61±0.15 |
| BiC | 51.58±0.16 | 48.07±0.02 | 43.10±0.37 | 70.07 | 64.96 | 57.73 | 43.23±0.13 | 38.83±0.12 |
| LUCIR | 66.27±0.28 | 60.80±0.29 | 52.96±0.25 | 70.60±0.43 | 67.76±0.40 | 62.76±0.22 | 56.40±0.16 | 52.75±0.16 |
| +CwD (ours) | 67.26±0.16 | 62.89±0.09 | 56.81±0.21 | 71.94±0.11 | 69.34±0.13 | 65.10±0.50 | 57.42±0.11 | 53.37±0.22 |
| PODNet | 66.98±0.13 | 63.76±0.48 | 61.00±0.18 | 75.71±0.37 | 72.80±0.35 | 65.57±0.41 | 57.01±0.12 | 54.06±0.09 |
| +CwD (ours) | 67.44±0.35 | 64.64±0.38 | 62.24±0.32 | 76.91±0.16 | 74.34±0.02 | 67.42±0.07 | 58.18±0.23 | 56.01±0.14 |
| AANet | 69.79±0.21 | 67.97±0.26 | 64.92±0.30 | 71.96±0.12 | 70.05±0.63 | 67.28±0.34 | 51.76*±0.14 | 46.86*±0.13 |
| +CwD (ours) | 70.30±0.17 | 68.62±0.17 | 66.17±0.13 | 72.92±0.20 | 71.10±0.16 | 68.18±0.27 | 52.30*±0.08 | 47.61*±0.20 |

1100
1110 TABLE
| S | B | LUCIR | +CwD (ours) | ↑ |
|---|---|---|---|---|
| 10 | 10 | 57.01±0.14 | 57.90±0.07 | +0.89 |
|  | 20 | 61.21±0.35 | 62.49±0.36 | +1.28 |
|  | 30 | 64.82±0.38 | 66.54±0.35 | +1.72 |
|  | 40 | 67.68±0.37 | 69.70±0.10 | +2.02 |
|  | 50 | 70.60±0.43 | 71.94±0.13 | +1.33 |
| 5 | 10 | 50.47±0.31 | 51.92±0.10 | +1.45 |
|  | 20 | 56.41±0.37 | 58.14±0.13 | +1.73 |
|  | 30 | 61.00±0.09 | 63.18±0.14 | +2.18 |
|  | 40 | 63.73±0.23 | 66.25±0.18 | +2.52 |
|  | 50 | 67.76±0.40 | 69.34±0.31 | +1.58 |
1120 TABLE
| S | B | LUCIR | +CwD (ours) | ↑ |
|---|---|---|---|---|
| 10 | 40 | 72.41±0.61 | 73.29±0.13 | +0.88 |
|  | 30 | 71.70±0.37 | 72.63±0.15 | +0.93 |
|  | 20 | 70.60±0.43 | 71.94±0.11 | +1.34 |
|  | 10 | 68.73±0.52 | 69.77±0.04 | +1.04 |
|  | 5 | 66.49±0.52 | 67.63±0.07 | +1.14 |
| 5 | 40 | 70.74±0.49 | 72.06±0.11 | +1.32 |
|  | 30 | 68.56±0.42 | 70.04±0.12 | +1.44 |
|  | 20 | 67.76±0.40 | 69.34±0.31 | +1.58 |
|  | 10 | 64.07±0.38 | 66.07±0.46 | +2.00 |
|  | 5 | 60.41±0.77 | 62.58±0.53 | +2.17 |
Fig. 11
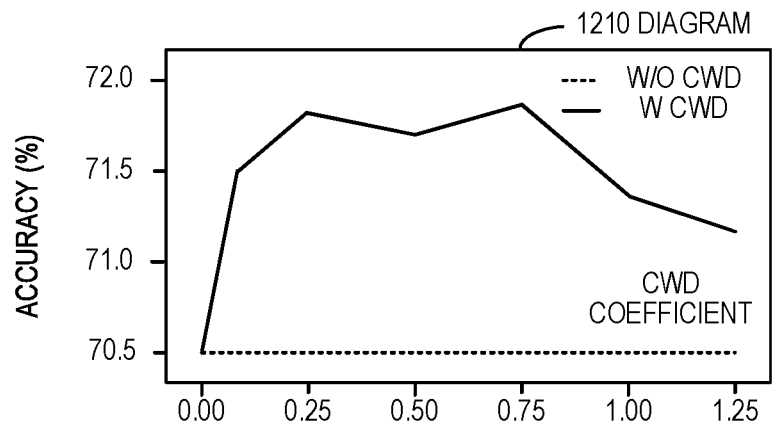
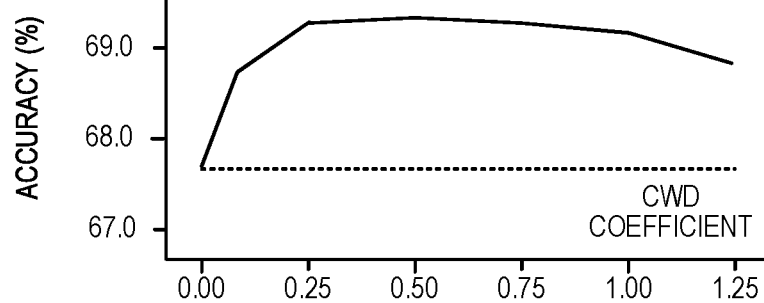
Fig. 12

US 12,340,560 B2

SYSTEMS AND METHODS FOR GENERATING A CLASSIFICATION MODEL USING PRIMARY AND SECONDARY LOSS FUNCTIONS

FIELD

The present disclosure generally relates to sample classification, and more specifically, to methods, devices, and computer program products for sample classification in Class Incremental Learning (CIL).

BACKGROUND

Nowadays, the machine learning technique has been widely used in sample processing. For example, the CIL solution has been developed for training a classification model gradually when the training data cannot be obtained at one time. Specifically, the training procedure may be divided into multiple phases and a subset of the training data may be received in each phase. In each phase, the classification model may be trained by the corresponding subset of training data, and then the classification model may be gradually trained in the multiple phases. The major challenge of CIL is that model performance on the training data that is used in previous phases usually degrades seriously after being trained by the newly received training data in the subsequent phases, which is referred to as catastrophic forgetting. At this point, how to alleviate the forgetting problem and ensure the performance of the classification model effectively becomes a hot focus.

SUMMARY

In a first aspect of the present disclosure, there is provided a method for sample classification. In the method, a first group of data are received, here data in the first group of data comprises a sample and a classification of the sample, and the classification belonging to a first group of classifications in a plurality of classifications associated with the data. A plurality of data with the classification are selected from the first group of data. A first and a second loss function are determined for training a classification model that represents an association relationship between samples and classifications of the samples based on a plurality of samples comprised in the plurality of data and the classification, the first loss function represents difference between the classification and classification predictions for the plurality of samples determined by the classification model, respectively, and the second loss function represents a distribution of a plurality of features for the plurality of samples determined by the classification model in a feature space of the classification model. The classification model is trained based on the first and second loss functions.

In a second aspect of the present disclosure, there is provided an electronic device. The electronic device comprises: a computer processor coupled to a computer-readable memory unit, the memory unit comprising instructions that when executed by the computer processor implements a method according to the first aspect of the present disclosure.

In a third aspect of the present disclosure, there is provided a computer program product, the computer program product comprising a computer readable storage medium having program instructions embodied therewith, the program instructions executable by an electronic device to cause the electronic device to perform a method according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE SEVERAL VIEWS OF THE DRAWINGS

Through the more detailed description of some implementations of the present disclosure in the accompanying drawings, the above and other objects, features, and advantages of the present disclosure will become more apparent, wherein the same reference generally refers to the same components in the implementations of the present disclosure.

FIG. 11 illustrates an example diagram of effects of different factors on the CwD solution according to implementations of the present disclosure;

FIG. 12 illustrates an example diagram of effects of weight factors on the CwD solution according to implementations of the present disclosure;

DETAILED DESCRIPTION

Figure 1:
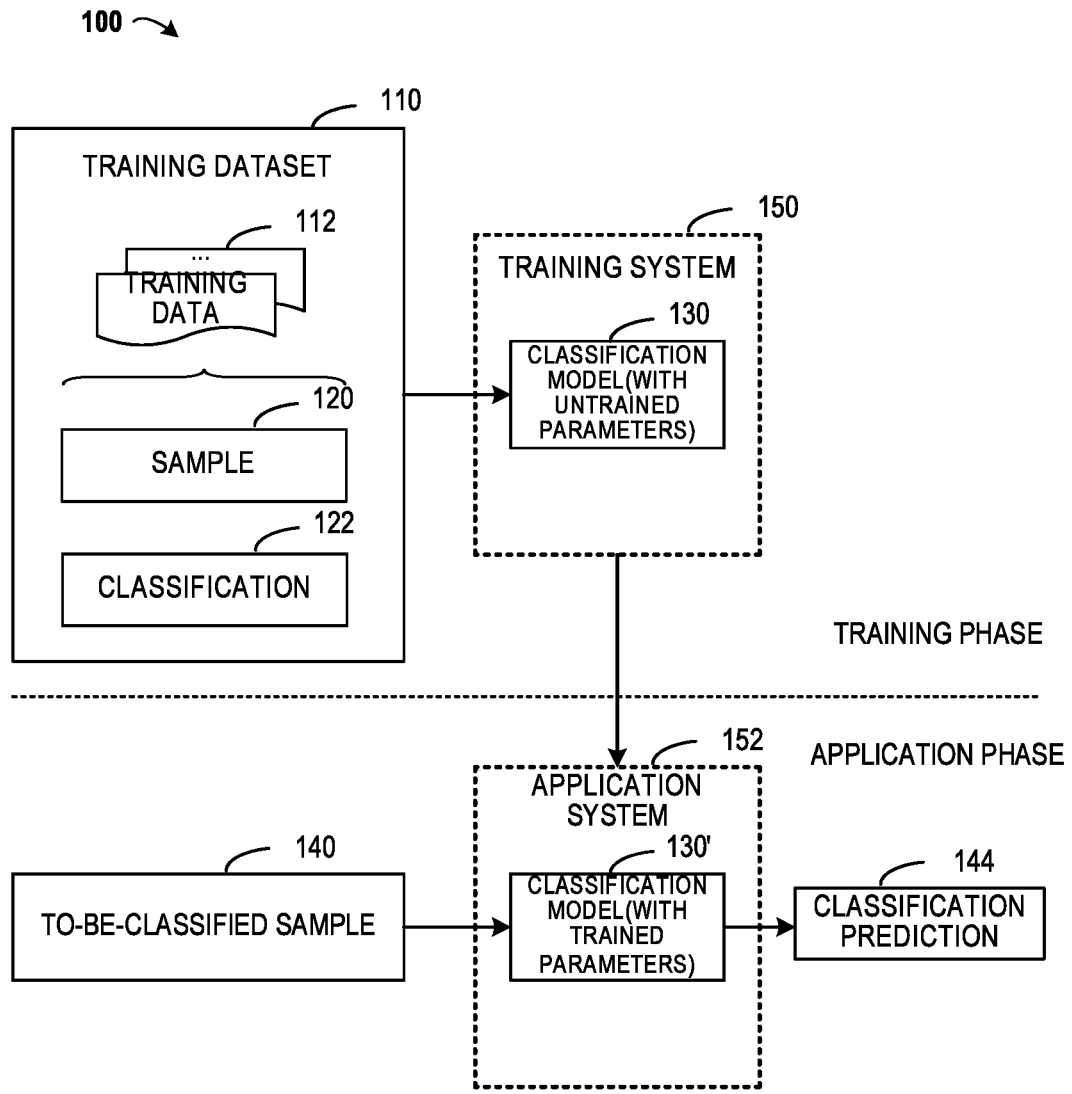
FIG. 1 illustrates an example environment for sample classification according to the machine learning technique.

Principle of the present disclosure will now be described with reference to some implementations. It is to be understood that these implementations are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one implementation," "an implementation," "an example implementation," and the like indicate that the implementation described may include a particular feature, structure, or characteristic, but it is not necessary that every implementation includes the particular feature, structure, or characteristic. Moreover, such phrases are not necessarily referring to the same implementation. Further, when a particular feature, structure, or characteristic is described in connection with an example implementation, it is submitted that it is within the knowledge of one skilled in the art to affect such feature, structure, or characteristic in connection with other implementations whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example implementations. As used herein, the term "and/or" includes any and all combinations of one or more of the listed terms.

The terminology used herein is for the purpose of describing particular implementations only and is not intended to be limiting of example implementations. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Principle of the present disclosure will now be described with reference to some implementations. It is to be understood that these implementations are described only for the purpose of illustration and help those skilled in the art to understand and implement the present disclosure, without suggesting any limitation as to the scope of the disclosure. The disclosure described herein can be implemented in various manners other than the ones described below. In the following description and claims, unless defined otherwise, all technical and scientific terms used herein have the same meaning as commonly understood by one of ordinary skills in the art to which this disclosure belongs.

It may be understood that data involved in the present technical solution (including but not limited to the data itself, the acquisition or use of the data) should comply with requirements of corresponding laws and regulations and relevant rules.

It may be understood that, before using the technical solutions disclosed in various implementation of the present disclosure, the user should be informed of the type, scope of use, and use scenario of the personal information involved in the present disclosure in an appropriate manner in accordance with relevant laws and regulations, and the user's authorization should be obtained.

For example, in response to receiving an active request from the user, prompt information is sent to the user to explicitly inform the user that the requested operation will need to acquire and use the user's personal information. Therefore, the user may independently choose, according to the prompt information, whether to provide the personal information to software or hardware such as electronic devices, applications, servers, or storage media that perform operations of the technical solutions of the present disclosure.

As an optional but non-limiting implementation, in response to receiving an active request from the user, the way of sending prompt information to the user, for example, may include a pop-up window, and the prompt information may be presented in the form of text in the pop-up window. In addition, the pop-up window may also carry a selection control for the user to choose "agree" or "disagree" to provide the personal information to the electronic device.

It may be understood that the above process of notifying and obtaining the user authorization is only illustrative and does not limit the implementation of the present disclosure. Other methods that satisfy relevant laws and regulations are also applicable to the implementation of the present disclosure.

For the purpose of description, the following paragraphs will provide more details by taking an image classification system as an example environment. In the image classification system, the to-be-classified images may include various contents. For the purpose of description, the images may include integer numbers such as 1, 2, . . . , 9, and 0, and the image classification system may be trained to classify these images into classifications of "class 1," "class 2," . . . , "class 0." In another example, the images may include pictures with other contents such as the cat, the dog, and so on, and the classification system may be trained to classify these images into different animal types.

In FIG. 1, a classification model 130 may be provided for classifying the images. Here, the environment 100 includes a training system 150 and an application system 152. The upper portion of FIG. 1 shows a training phase, and the lower portion shows an application phase. Before the training phase, the classification model 130 may be configured with untrained or partly trained parameters (such as initial parameters, or pre-trained parameters). In the training phase, the classification model 130 may be trained in the training system 150 based on a training dataset 110 including a plurality of training data 112. Here, each training data 112 may have a two-tuple format, and may include a sample 120 (for example, an image including an integer number) and a classification 122 for the sample 120 (for example, a label of the integer number recognized in the image). Specifically, a large amount of training data 112 may be used to implement the training phase iteratively. After the training phase, the parameters of the classification model 130 may be updated and optimized, and a classification model 130' with trained parameters may be obtained. At this point, the classification model 130' may be used to implement the predication task in the application phase. For example, the to-be-processed sample 140 may be inputted into the application system 152, and then a corresponding classification predication 144 may be outputted.

In FIG. 1, the training system 150 and the application system 152 may include any computing system with computing capabilities, such as various computing devices/systems, terminal devices, servers, and so on. The terminal device may involve any type of mobile device, fixed terminal, or portable device, including mobile phones, desktop computers, laptop computers, notebook computers, netbook computers, tablet computers, media computers, multimedia tablets, or any combination of the foregoing, including the accessories and peripherals of these devices or any combination thereof. Servers may include but are not limited to mainframes, edge computing nodes, computing devices in cloud environments, and so on. It should be understood that the components and arrangements in the environment 100 in FIG. 1 are only examples, and a computing system suitable for implementing the example implementation described in the present disclosure may include one or more different components, and other components. For example, the training system 150 and the application system 152 may be integrated in the same system or device.

As illustrated in FIG. 1, the training dataset 110 may include a great number of images and corresponding classification labels. However, it is hard to obtain the whole training dataset 110 at one time, and usually the training dataset 110 is obtained in multiple phases during the CIL procedure. For example, images including the integer numbers "1" and "2" are obtained in the first phase of the CIL procedure, and then images including the integer numbers "3" and "4" are obtained in the second phase of the CIL procedure, . . . , and the images including the integer numbers "9" and "0" are obtained in the last phase of the CIL procedure. Therefore, the classification model 130 may be trained in multiple phases so as to obtain the classification model 130'. However, subsequent training phases in the CIL procedure may cause the classification model 130' to forget knowledges that are learned from previous training phases, and this problem is referred to as catastrophic forgetting.

By now, various solutions have been developed for alleviate the catastrophic forgetting. For example, multiple solutions focus on phases after the initial one, e.g. introducing forgetting-reduction regularization terms that enforce the current-phase model and the previous-phase model to produce similar outputs of the same input. However, these solutions do not realize the importance of the initial phase. Although these solutions may solve the forgetting problem to a certain extent, performance of the classification model is still not very satisfactory. At this point, how to alleviate the forgetting and increase the performance of the classification model effectively becomes a hot focus.

Figure 2:
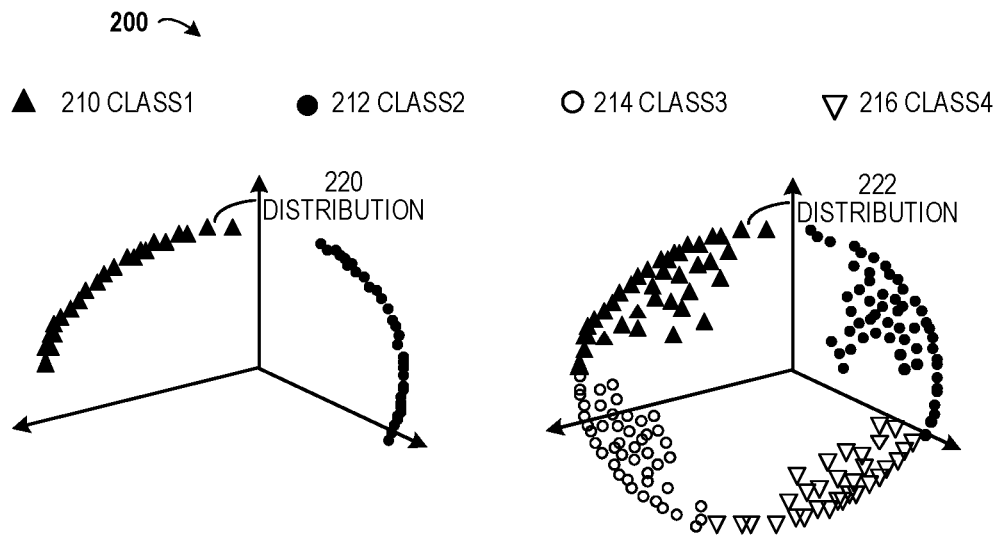
FIG. 2 illustrates an example diagram of a feature distribution of samples during different phases in the CIL procedure according to a solution.

During the classification procedure, the to-be-classified image is first encoded into a feature in a feature space of the classification model. Here, the feature space may be defined in multiple dimensions. For a feature space with 32 dimensions, the feature of the image may be represented by a vector with 32 dimensions. Alternatively and/or in addition to, the feature space may have more or less dimensions. The features for images may be at various positions in the feature space. Referring to FIG. 2 for a simplified visual view, here FIG. 2 illustrates an example diagram of a feature distribution of samples during different phases in the CIL procedure according to a solution.

In FIG. 2, legends with different shapes represent features for images with different classifications, respectively. For example, a legend 210 may represent a feature for an image which is classified into "class 1 (for example, including the integer number "1"), and legends 212, 214 and 216 may represent features of images that are classified into "class 2," "class 3," and "class 4" (for example, including the integer number "2" "3," and "4"), respectively. As shown in the left side, a distribution 220 represents the feature distribution of image features after the classification model is trained in a first phase (such as an initial phase or an earlier phase in the CIL procedure), where the training data includes only images with "class 1" and "class 2." The classification model obtained in the initial phase with a small portion of all the training classes may also be called as a naively-trained model, which only have the knowledges associated with the classes provided in the initial phase. Although the distribution 220 is illustrated in a three-dimension (3D) view, the 3D view here is provided for a visual purpose, and it is obtained from a dimensionality reduction operation for reducing a high-dimension format (for example, 32 dimensions) into the 3D format.

The right side of FIG. 2 shows a distribution 222 of features after the classification model is trained in a second phase (for example, subsequent phases that follow the initial phase, especially the last phase). In other words, the distribution 222 is obtained from an ideal classification model (also referred to as an oracle model, which is trained by images with all of the four classes 1-4). As shown by the distribution 222, features obtained from the oracle model scatter among the feature space evenly. Meanwhile, in the distribution 220, features obtained from the naively-trained model after the initial phase in the CIL procedure reside in a long and narrow region and are not evenly distributed in the feature space. At this point, even if subsequent training phases are based on the distribution 220, there is a possibility that the classification model will never reach the oracle model. In other words, the feature distribution 220 in the initial phase plays an important role in the whole training procedure and greatly affects an accuracy level of the classification model.

In view of the above, the present disclosure proposes a sample classification solution for the CIL procedure. Specifically, the present disclosure directly causes the CIL learner at the initial phase to output similar features as the model jointly trained on all classes, so as to increase the CIL performance. Further, the difference between the naively-trained model and the oracle model are considered in the CIL procedure. Specifically, one major difference is that the two models have different numbers of training classes. With fewer training classes in the initial phase, the features of each class lie in a long and narrow region (as shown by the distribution 220 in FIG. 2); while with more training classes in the subsequent phases, the features of each class scatter more uniformly in the feature space. Based on the above, a Class-wise Decorrelation (CwD) solution is provided in the present disclosure, here the CwD solution may effectively regularize features of each class to scatter in a more uniform way, so as to mimic the feature distribution for the model jointly trained with all classes (i.e., the oracle model).

Figure 3:
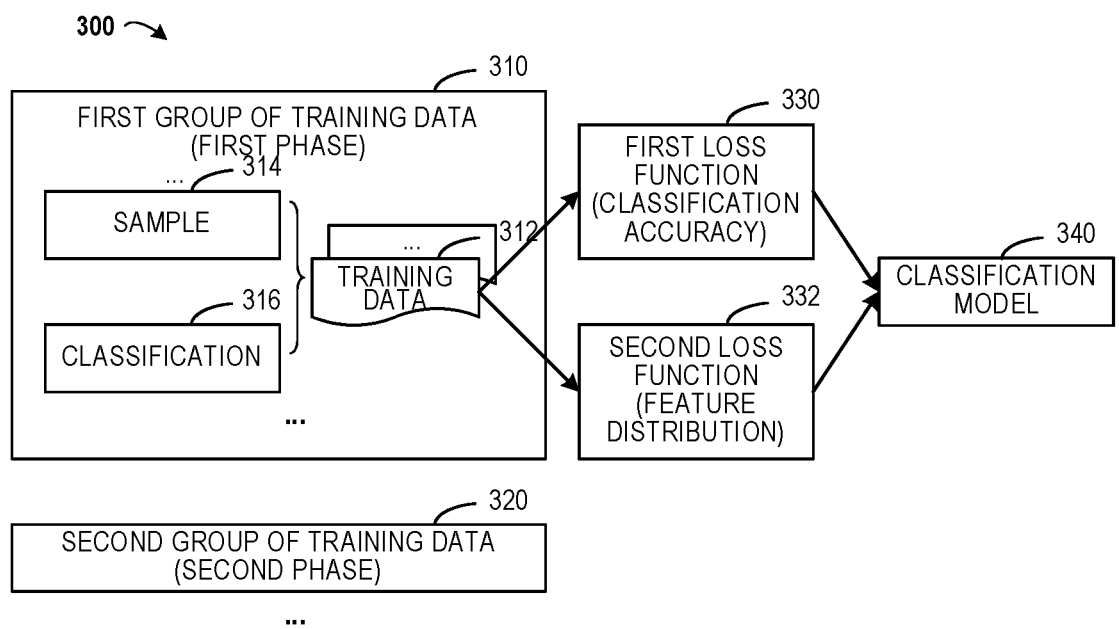
FIG. 3 illustrates an example diagram for obtaining a classification model according to implementations of the present disclosure.

In implementations of the present disclosure, the feature distribution for samples is considered in generating the classification model, and thus the classification model may be trained towards a direction that the feature distribution in the initial phase should be in a pattern similar as the feature distribution for the oracle model. In other words, in the initial phase of the CIL procedure, the feature distribution for the training samples should be evenly scattered in the feature space of the classification model. FIG. 3 illustrates an example diagram 300 for obtaining a classification model 340 according to implementations of the present disclosure. In FIG. 3, the CIL procedure may be implemented in multiple phases for training the classification model 340, and a group of training data may be obtained in each phase. For example, the first group of training data 310 may be obtained in the first phase (for example, the initial phase or an earlier phase in the CIL procedure), and the second group of training data 320 may be obtained in the second phase that follows the first phase, and so on. Hereinafter, procedures in all these phases are similar, and the first phase will be taken as an example for providing details of the sample classification.

In FIG. 3, the first group of training data may include multiple training data 312, and each training data may include a sample 314 and a classification 316 for the sample 314. In the environment of image classification, the sample 314 may be an image including an integer number, and the classification 316 may be a label (for example, manually provided) for identifying the integer number. Specifically, the classification 316 may be identified as "class 1" if the sample 314 is an image including the integer number "1," and the classification 316 may be identified as "class 2" if the sample 314 is an image including the integer number "2." Here, the first group of training data 310 may include multiple training data with one or more classifications. For example, the first group may of training data 310 may include 100 training data (with the classification of "class 1") and 50 training data (with the classification of "class 2"). In another example, the first group may include more or less training data with different classifications.

Further, the first group of training data 310 may be divided into one or more portions according to the classification 316. Supposing there are two classifications "class 1" and "class 2," the training data related to the two classifications may be processed one by one. Here, training data with the classification "class 1" may be used to determining a first and a second loss functions 330 and 332 for training the classification model 340. Specifically, the first loss function 330 represents difference between the classification and classification predictions for the samples determined by the classification model, respectively. Meanwhile, the second loss function 332 represents a distribution of a plurality of features for the plurality of samples determined by the classification model 340 in a feature space of the classification model 340.

In implementations of the present disclosure, the first loss function 330 is a primary loss function for controlling the classification accuracy of the classification model 340, which may be determined according to the conventional solutions in the machining learning technique, i.e., training the classification model 340 toward a direction to minimize the difference between the labeled classification 316 and the classification prediction determined by the classification model 340. The second loss function 322 is a secondary loss function for controlling the distribution for the sample features, which are intermediate variables generate by the classification model 340 during the CIL procedure. In other words, the second loss function 332 may lead the classification model 340 to generate features that are evenly scattered in the feature space in the initial phase.

With these implementations, correlations between the multiple dimensions of the feature space may be reduced by the second function 332, such that the feature distribution for the classification model 340 trained in the initial phase may mimic the feature distribution of the oracle model at the end of the CIL procedure. Accordingly, each dimension in the feature space may represent information in the images in a more individual way. Based on the first and second loss functions 330 and 332, the classification model 340 may be trained toward a direction that considers both of the classification accuracy and the feature distribution, and then the classification accuracy may further be increased with the even feature distribution.

Figure 4:
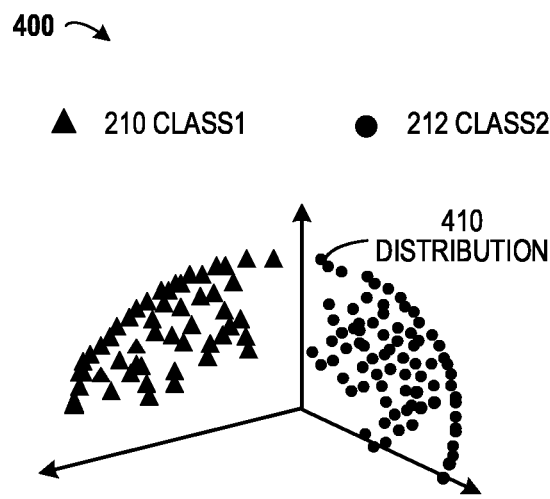
FIG. 4 illustrates an example diagram of a feature distribution of samples during a first phase in the CIL procedure according to implementations of the present disclosure.

FIG. 4 illustrates an example diagram 400 of a feature distribution of samples during a first phase in the CIL procedure according to implementations of the present disclosure. Compared with the long and narrow distribution 220 in FIG. 2, a distribution 410 of the feature determined by the proposed CwD solution in the initial phase shows a uniformly scattered pattern in FIG. 4. Therefore, the distribution 410 may effectively regularize features of each class to scatter more uniformly, thus mimicking the model jointly trained with all classes (i.e., the oracle model).

In implementations of the present disclosure, experiments are conducted to prove that directly mimicking the oracle model at the initial phase may improve performance of the classification model 340. Specifically, in the initial phase, an additional regularization term is added to the training objective of the classification model 340, which may cause the model to output uniform features similar as the oracle model, yielding the following objective function:

$$\min_\theta L_{ce}(x, y, \theta) + \beta\left(1 - \frac{f_\theta(x)^\top f_{\theta^*}(x)}{\|f_\theta(x)\|_2 \|f_{\theta^*}(x)\|_2}\right) \quad \text{Formula 1}$$

In Formula 1, $\theta$ indicates the model parameters (such as the network parameters), and $\theta^*$ indicates parameters of the oracle model (which are fixed). $L_{ce}$ (x, y, $\theta$) indicates the standard cross entropy loss, (x, y) indicates the training data (where x corresponds the sample and y corresponds the classification label), and $\beta$ indicates a hyper-parameter for controlling the strength of the loss functions associated with the feature distribution. $f_\theta(x)$ and $f_{\theta^*}(x)$ indicate the features produced by the naively-trained model and the oracle model, respectively. The second term in this objective is the regularization that enforces $f_\theta(x)$ to be similar to $f_{\theta^*}(x)$.

Figure 5:
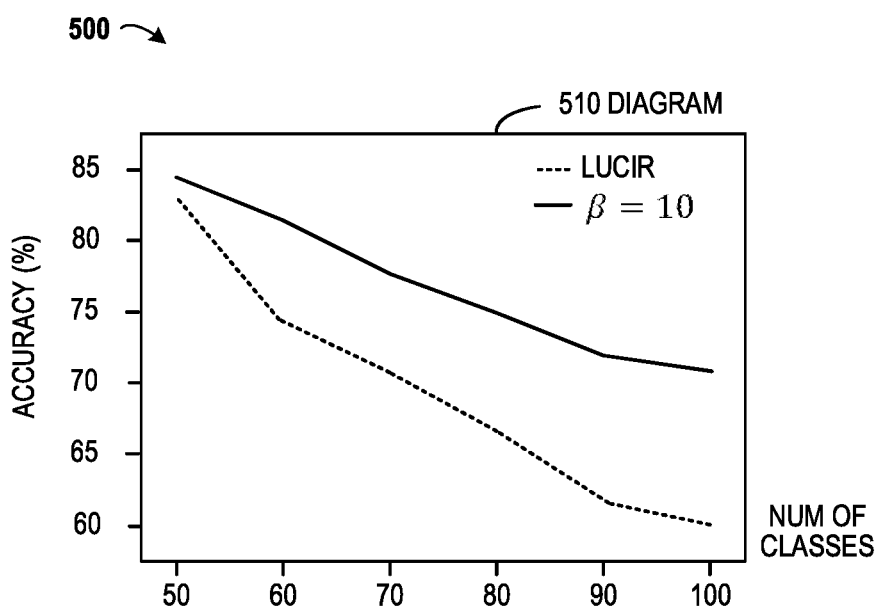
FIG. 5 illustrates an example diagram of effects for mimicking features for the oracle model by feature distribution regularization according to implementations of the present disclosure.

The experiments are conducted on multiple open image databases such as ImageNet100 and ResNet18. Formula 1 may be used as the optimization objective for the initial phase with the baseline of the conventional CIL procedure. Referring to FIG. 5 for an accuracy comparison between solutions with and without the feature distribution regularization. FIG. 5 illustrates an example diagram 500 of effects for mimicking features for the oracle model by feature distribution regularization according to implementations of the present disclosure. In FIG. 5, the horizontal axis indicates the number of classes, and the vertical axis indicates the accuracy. A diagram 510 shows an accuracy comparison between the conventional LUCIR solution and the proposed feature distribution regularization (when $\beta$=10 in Formula 1). In this experiment, the training data of the initial phase may include 50 classes and then incremented with 10 classes per phase for 5 more phases. From FIG. 5, the accuracy of the proposed solution based on Formula 1 is much higher than that of the conventional LUCIR solution.

Although this regularization is only applied at the initial phase, it negligibly improves the accuracy of initial phase, but significantly improves the performance in subsequent phases. Therefore, the improvements are not due simply to an accuracy boost at the initial phase, but because the initial-phase model is more favorable for incrementally learning new classes. Similar experiments may be conducted by setting $\beta$ to different values (such as 5, 15 and the like). Meanwhile, the number of the classes involved in each phase may be modified, for example, the training data of the initial phase may include 10 classes and then incremented 10 classes per phase for 9 more phases. These experiments may lead to similar trend of the accuracy, and the proposed feature distribution regularization may increase the accuracy of the classification model.

Figure 6:
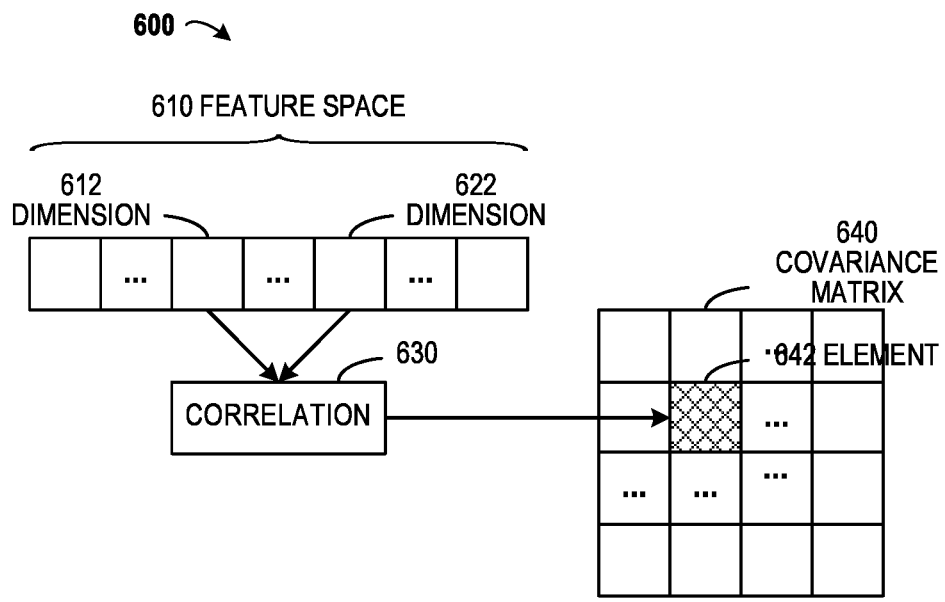
FIG. 6 illustrates an example diagram for determining correlation relationships among a plurality of dimensions in a feature space of the classification model according to implementations of the present disclosure.

In implementations of the present disclosure, a covariance matrix may be provided for describing the feature distribution. The covariance matrix is a type of matrix that is used to represent the covariance values between pairs of elements given in a vector. FIG. 6 illustrates an example diagram 600 for determining correlation relationships among a plurality of dimensions in a feature space of the classification model according to implementations of the present disclosure. In FIG. 6, the feature space 610 may include d dimensions, and the correlation relationship may include the correlation between any pair of the dimensions in the feature space 610. Here, the correlation 630 may be determined between the $i^{th}$ dimension 612 and the $j^{th}$ dimension 614, so as to determine an element 642 in the covariance matrix 640. Further, the covariance matrix 640 may be determined from the training data in the initial phase.

Since the oracle model is trained with more classes than the naively-trained model, an eigenvalue analysis may be conducted to find how the number of classes used for training affects the feature distribution. For a given class c in the initial phase, suppose there are n data points, $Z_i^{(c)}) \in \mathbb{R}_d$ indicates the model output feature on the $i^{th}$ data point of class c, and the mean vector of all features with class c is indicated as $$\overline{Z}^{(c)} = \frac{1}{n}\sum_{i=1}^{n} Z_i^{(c)}.$$

The covariance matrix of features (with class c) is estimated in an unbiased manner as:

$$K^{(c)} = \frac{1}{n-1}\sum_{i=1}^{n}\left(Z_i^{(c)} - \overline{Z}^{(c)}\right)\left(Z_i^{(c)} - \overline{Z}^{(c)}\right)^T \quad \text{Formula 2}$$

Based on the estimated covariance matrix, an eigendecomposition may be performed: $K^{(c)} = U \Sigma^{(c)} U^T$, where $\Sigma^{(c)}$ indicates a diagonal matrix with eigenvalues ($\lambda_1^{(c)}$, $\lambda_2^{(c)}, \ldots, \lambda_d^{(c)}$) on the diagonal. Without loss of generality, it is assumed that the eigenvalues are sorted in descending order. To observe whether the top eigenvalues dominate, the following Formula 3 may be defined:

$$\alpha_k^{(c)} := \frac{\sum_{i=1}^{k} \lambda_i^{(c)}}{\sum_{i=1}^{d} \lambda_i^{(c)}} \in [0, 1] \quad \text{Formula 3}$$

Figure 7:
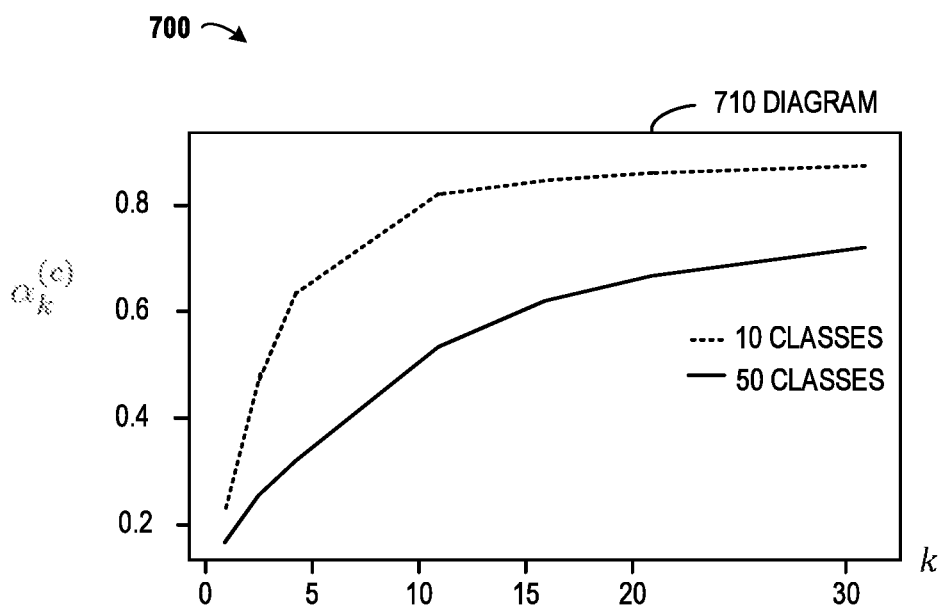
FIG. 7 illustrates an example diagram of a feature distribution associated with training data sets with different number of classes according to implementations of the present disclosure.

Here, $\alpha_k^{(c)}$ measures the proportion of variance represented by the top k (an integer number) eigenvalues. If $\alpha_k^{(c)}$ is close to 1 (even when k is small), then the top eigenvalues of $\alpha_k^{(c)}$ dominate. FIG. 7 illustrates an example diagram 700 of a feature distribution associated with training datasets with different number of classes according to implementations of the present disclosure, and here $\alpha_k^{(c)}$ changes with k. FIG. 7 shows the solutions when the classification model is trained with 10 classes and 50 classes. Here, the horizontal axis indicates the top k eigenvalues, and the vertical axis indicates the domination level of the top k eigenvalues. In FIG. 7, $\alpha_k^{(c)}$ increases quickly for $k \in \{1, 2, \ldots, 10\}$, and then saturates at a value close to 1 as k keep increasing. This shows that for the model trained with 10 classes, the top eigenvalues dominate for covariance matrix of data features of each class, indicating that features lie in a long and narrow region. In addition, for any fixed k, $\alpha_k^{(c)}$ strictly decreases as the model is trained with more classes. This shows that, when the model is trained with more classes, the top $\alpha_k^{(c)}$ eigenvalues become less dominant, suggesting that the data representations of each class scatter more uniformly. Since the oracle model is trained with more classes than the naively-trained model, class-wise feature of the oracle model scatter more uniformly.

Based on the above, the present disclosure proposes the CwD solution for training the classification model by the decorrelation of dimensions of the feature space. Specifically, an initial version of the classification model 340 may be obtained in the initial phase, here the initial version may be configured with untrained or partly trained parameters (such as initial parameters, or pre-trained parameters), and then it may be trained gradually in various phases of the CIL procedure. In the initial phase, the samples with a certain classification (for example, class c) may be inputted the classification model 340, and the classification model 340 may determine corresponding features for these samples. Then, a correlation relationship may be determined for the plurality of features over the plurality of dimensions in the feature space, and then the second loss function 330 may be determined based on the correlation relationship.

Here, an initial version of the classification model 340 may be used for obtaining the features in the initial phase, and then the obtained features may be used for determining the trend for training the classification model 340. Specifically, the objective of the CIL learner may be optimized to mimic the oracle model at the initial phase, and thus enforce features of each class to scatter more uniformly. This purpose may be achieved by adding the following regularization objective (i.e., the second cost function 322) for each class c in the initial phase:

$$L_{shape}^{(c)} = \frac{1}{d}\sum_{i=1}^{d}\left(\lambda_i^{(c)} - \frac{1}{d}\sum_{j=1}^{d}\lambda_j^{(c)}\right)^2 \quad \text{Formula 4}$$

In Formula 4, d indicates the dimension number of the feature space. Minimizing this objective may enforce all eigenvalues to be close, preventing the top eigenvalues to dominate and encouraging the feature for class c to scatter more uniformly. However, this regularization objective is not practical because determining the eigenvalues is expensive in the computation workload. In order to achieve the desired regularization in an implementation-friendly way, the features for the class c may processed in advance.

In implementations of the present disclosure, the features for the class c may be normalized so as to reduce the further workload related to the above Formula 4. Specifically, a mean feature $$\left(\overline{Z}^{(c)} = \frac{1}{n}\sum_{i=1}^{n} Z_i^{(c)}\right)$$

and a deviation (such as a standard deviation $\sigma^{(c)}(Z) \in \mathbb{R}^d$, $$\sigma^{(c)}(Z) = \sqrt{\frac{\sum_{i=1}^{n}\left(Z_i^{(c)} - \overline{Z}^{(c)}\right)^2}{n-1}})$$

may be determined for all the features for the class c, and then these features may be normalized. With these implementations, each of the features may be normalized in advance by mathematical operations, so as to simplify the further computation. In implementations of the present disclosure, the normalized feature may be determined based on the following Formula 5:

$$Z_i^{(c)\prime\prime} = \frac{Z_i^{(c)} - \overline{Z}^{(c)}}{\sigma^{(c)}(Z)} \qquad \text{Formula 5}$$

In Formula 5, $\sigma^{(c)}(Z) \in \mathbb{R}^d$ indicates the standard deviation for all the features for the class c, and the division is done elementwise. Therefore, with respect to the $i^{th}$ feature $Z_i^{(c)}$) for the class c, the normalized feature $Z_i^{(c)\prime\prime}$ may be determined according to Formula 5, i.e., the normalized feature may be determined by dividing the difference between the feature and the mean with the deviation. Further, the plurality of normalized features may be used for determining the correlation relationship. With these implementations, the normalization procedure may be easily implemented by mathematical operations, and then the further computation workload for training classification model may be reduced.

In implementations of the present disclosure, a covariance matrix may be generated for the plurality of normalized features $Z_i^{(c)\prime\prime}$ to represent the correlation relationship. Specifically, the above Formula 2 may be used to determine the covariance matrix $K^{(c)}$, and here the term $Z_i^{(c)}$ in Formula 2 may be replaced with $Z_i^{(c)\prime\prime}$ due to the feature $Z_i^{(c)}$ has been normalized to $Z_i^{(c)\prime\prime}$. It is to be understood that the feature $Z_i^{(c)}$ is outputted by the classification model 340 (configured with the network model parameter θ), and thus $Z_i^{(c)}$ depends on the network parameter θ. Since the normalization procedure only relates to the mathematical operations, the normalized feature $Z_i^{(c)\prime\prime}$ also depends on the network parameter θ for the classification model 340.

With these implementations of the present disclosure, the correlation relationship may be represented in a mathematical formula based on the network parameter θ for the classification model 340. Further, based on Formula 4, the objective for training the classification model 340 is converted into the problem for minimizing the loss function $L_{shape}^{(c)}$ (where the eigenvalue $\lambda_i^{(c)}$ in $L_{shape}^{(c)}$ also depends on the network parameter θ for the classification model 340). Therefore, the complex technical problem for scattering the features for the class c is converted into a simple problem for minimizing the loss function. Accordingly, the complex technical problem may be simplified and easily solved by mathematical operations.

In implementations of the present disclosure, in order to determine the eigenvalues, a norm (such as the Frobenius norm) may be determined for the covariance matrix, and then the eigenvalues may be represented based on the norm and a dimension number d of the feature space. Since all the features have been normalized, the normalization results in the covariance matrix $K^{(c)}$ (defined in Formula 2) is equivalent to a correlation matrix, which satisfies the following Formula 6:

$$\Sigma_{j=1}^{d} \lambda_j^{(c)} = Tr(K^{(c)}) = d \qquad \text{Formula 6}$$

In Formula 6, Tr(·) indicates the matrix trace operator and d indicates the dimension of $K^{(c)}$. Then, by the following proposition, the Frobenius norm of a correlation matrix and its eigenvalues may be related together based on mathematical derivations:

Proposition 1. For a d-by-d correlation matrix K and its eigenvalues $(\lambda_1, \lambda_2, \ldots, \lambda_d)$, the following Formula 7 may be determined:

$$\sum_{i=1}^{d} \left( \lambda_i - \frac{1}{d} \sum_{j=1}^{d} \lambda_j \right)^2 = \|K\|_F^2 - d \qquad \text{Formula 7}$$

It shows that for any correlation matrix K, minimizing $L_{shape}$ defined in Formula 4 is equivalent to minimizing $\|K\|_F^2$. With this proposition, the impractical regularization in Formula 4 may be converted into the CwD objective below, which penalizes $\|K\|_F^2$ for every class c:

$$L_{CwD}(\theta) = \frac{1}{C \cdot d^2} \sum_{c=1}^{C} \|K^{(c)}\|_F^2 \qquad \text{Formula 8}$$

where C indicates the number of classes used when training at the initial phase, $K^{(c)}$ indicates the correlation matrix of class c estimated over the training data in the initial phase. Here, that c is a function of the parameter θ through its eigenvalues $\lambda_i$. With these implementations of the disclosure, the complex objective for training the classification model 340 is simplified into minimizing Formula 8. In other words, the objective is to find appropriate value for θ that minimizing the value of $L_{CwD}(\theta)$.

The above paragraphs have provided details for making the features for the class c to scatter evenly among the feature space. Meanwhile, due to the major purpose for the classification model 340 is to classify the image into a corresponding classification, the final loss function should also consider the difference between the labelled classification in the training data and the classification prediction that is outputted from the classification model 340.

In implementations of the present disclosure, the first loss function 330 may represent the difference between the labelled classification (i.e., the class c) and the classification prediction c' (which is based on the network parameter θ for the classification model 340). Therefore, the first loss function 330 may be represented as the term $L_{ce}(\theta)$, which depends on the network parameter θ and may be determined based on the conventional solutions in the machine learning technique and/or other solutions that are to be developed in the future. Further, the final loss function may be determined based on a weighting operation on the first loss function $L_{ce}(\theta)$ and the second loss function $L_{CwD}(\theta)$. For example, the following Formula 9 may be used for determining the final loss function:

$$\min_{\theta} L_{ce}(\theta) + \eta \cdot L_{CwD}(\theta) \qquad \text{Formula 9}$$

In Formula 9, although not explicitly indicated, the loss function also depends on the training data, i.e., values for the samples (represented as x) and values for the labelled classification (represented as y). In other words, the terms $L_{ce}(\theta)$ and $L_{CwD}(\theta)$ represent simplified formats for $L_{ce}(x, y, \theta)$ and $L_{CwD}(x, y, \theta)$, respectively. Here, η indicates a hyper-parameter for controlling strength of the CwD objective, values of (x, y) may be retrieved from the training data and are known during the training procedure. Only the network parameter θ is unknown and should be determined based on Formula 9.

With these implementations, the final loss function may consider both of the classification accuracy and the feature distribution during the initial phase of the CIL procedure, therefore features determined by the classification model 340 may scatter more evenly in the feature space, and feature distribution of the oracle classification model may be mimicked in the initial phase. Accordingly, the classification model 340 may be trained in a more accurate way and then the performance of the classification model 340 may be increased.

Figures 8, 9:
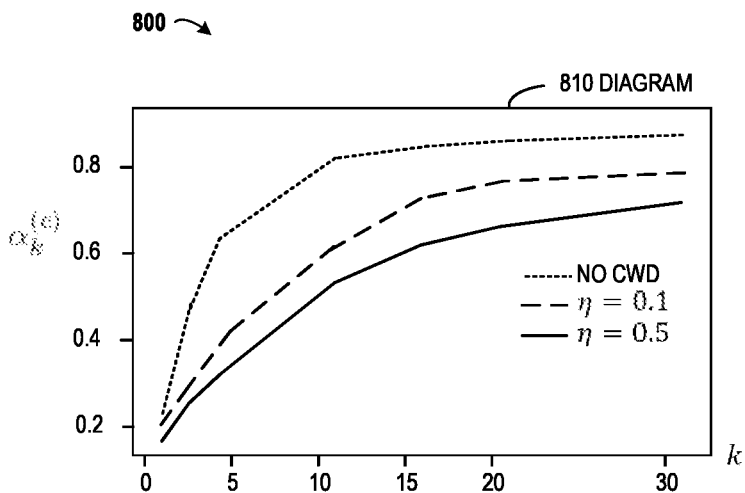
FIG. 8 illustrates an example diagram of effects of the CwD solution according to implementations of the present disclosure.
FIG. 9 illustrates an example diagram of comparisons between various conventional solutions and the CwD solution according to implementations of the present disclosure.

FIG. 8 illustrates an example diagram 800 of effects of the CwD solution according to implementations of the present disclosure. In FIG. 8, applying the CwD solution may effectively decrease $\alpha_k^c$) for the fixed k, and using larger η may decrease $\alpha_k^{(o)}$ more. This shows that the feature of each class scatter more uniformly after applying the CwD solution.

In implementations of the present disclosure, each classification in the first group of training data 310 may be processed in the similar way. Specifically, a plurality of data with a further classification may be selected from the first group of data 310, and then the first and second loss functions 330 and 332 may be updated based on the plurality of data with the further classification and the further classification. With these implementations, training data with all the classifications may be procedure gradually, and then the feature distribution in the initially phase may be distributed more evenly and thus the classification model in the initial phase may be optimized toward a direction for mimicking the oracle model.

In implementations of the present disclosure, during subsequent phases in the CIL procedure, the classification model 340 may be trained in a similar way. Specifically, the second group of data may be obtained, here data in the second group of data may comprise a sample and a classification of the sample, and the classification belonging to a second group of classifications in the plurality of classifications. Then, the first and second loss functions 330 and 332 may be updated based on the second group of data and the second group of classifications, and next the classification model may be updated based on the updated first and second loss functions. With these implementations, in each phase of the CIL procedure, all the training data may be used to update the first and second loss functions 330 and 332. In other words, all the training data contributes to increase both of the classification accuracy and the feature distribution. Therefore, the classification model 340 may be optimized in a more accurate way.

In implementations of the present disclosure, the classification model 340 may be used for classifying various samples. For example, an image classification model may be trained based on the above procedure for classifying images with different contents, an optical character recognition model may be trained for recognizing characters, and the like. Further, the classification model 340 may be modified for implementing other downstream tasks. For example, objects may be recognized in the image by the image classification model. Further, each image in an image sequence (such as a video) may be processed and then a target object (such as a car in the street) may be tracked by a traffic monitoring system.

In implementations of the present disclosure, experiments are conducted to investigate the potential of improving CIL at its initial phase. Specifically, at the initial phase, since the upper bound of CIL is the oracle model, the loss functions may be adjusted to produce similar features as the model trained with data of all classes (i.e., the oracle model). According to the experiments, this additional regularization drastically improves CIL performance. Although this term is used in the initial phase, it yields little performance gain in the initial phase. In contrast, it significantly benefits CIL performance in subsequent phases. This demonstrates that the performance improvements are not simply due to a higher accuracy at the initial phase, but because this regularization makes the initial-phase features more favorable for incrementally learning new classes.

The second loss function 332 may be helpful to mimic the oracle model in the initial phase. The following paragraphs shows the difference between features produced by the naively-trained model and the oracle model. Specifically, since the oracle model is trained with more classes, features are affected by the number of training classes. To this end, the covariance matrix of features of each class may be analyzed. Generally, when the data relates to fewer classifications, the top eigenvalues of the covariance matrix of features of each class dominate, indicating that the features of each class lie in a long and narrow region (see the distribution 220 in FIG. 2). On the other hand, for models trained with training data with more classifications (particularly, the oracle model), the top eigenvalues become less dominant, indicating that the features of each class scatter more uniformly (see the distribution 222 in FIG. 2).

In generating the second loss function, features for each classification may be forced to be more uniformly scattered at the initial phase, which mimics the features produced by the oracle model. To this end, a group of features will scatter more uniformly in the space if its correlation matrix has smaller Frobenius norm. Then, the Frobenius norm of the correlation matrix of the data features may be minimized for each class. Extensive experiments on various benchmark datasets show that the proposed CwD solution works well with conventional CIL procedures, yielding significant and consistent performance gain in different settings.

Having provided detailed steps for the sample classification, hereinafter, a pytorch-style pseudocode is proposed for the CwD solution, and then the CwD solution may be implemented in a computing device for training the classification model 340.

TABLE 1

PyTorch-style pseudocode for CwD

```
# N: batch size
# d: feature dimension
# z: a batch of features, with shape (N, d)
# y: a batch of label corresponding to z
def class_wise_decorrelation_loss(z, y):
    loss_cwd = 0.0 # initialize cwd loss
    unique_y = y.unique( ) # all classes in the batch
    for c in unique_y:
        # obtain all features of class c
        z_c = z[y==c, :]
        N_c = z_c.size(0)
        # skip if class c only has 1 sample
        if N_c == 1:
            continue
        # normalize features as in Formula 5
        z_c = (z_c - z_c.mean(0)) / z_c.std(0)
        # estimate correlation matrix
        corr_mat = 1/(N_c-1)*torch.matmul(z_c.t( ), z_c)
        # calculate CwD loss for class c
        loss_cwd += (corr_mat.pow(2)).mean( )
    return loss_cwd
```

As shown in Table 1, the purpose for minimizing Formula 9 is implemented by the above pseudocode. Here, with respect to the class c, features for the class c may be normalized and then a correlation matrix may be determined. Further, the second loss function $L_{CwD})$ ($\theta$) (indicated as "loss_cwd" in Table 1) may be determined and returned. With these implementations, the second loss function may be determined in a computerization way, and then the returned loss function and the common loss function may be weighted for training the classification model 340.

The above paragraphs have described details for generating the training objectives by mimicking the feature distributions and training the classification model 340 with the loss functions. The following paragraphs will provide examples for classifying new images based on the trained classification model 340. Here, the experiments may be performed based on the following databases: CIFAR100, which contains 100 classes, with 60000 samples, and the size of each image is 32*32; ImageNet, which contains 1000 classes, with about 1.3 million samples, and the size of each image is 224×224; ImageNet100, including 100-class subset of the full ImageNet. The classes of all datasets are first shuffled and then split into multiple phases.

For all experiments, ResNet18 and the SGD optimizer are selected with the batch size of 128. Further, various strategies (such as the Herding method) may be used to select exemplars after each phase. For experiments based on CIFAR100, in each CIL phase, all models are trained for 160 epochs and the learning rate is divided by 10 at the $80^{th}$ and $120^{th}$ epoch. For experiments based on ImageNet100/ImageNet, in each phase, all models are trained for 90 epochs and the learning rate is divided by 10 at the $30^{th}$ and $60^{th}$ epoch.

Here, the proposed CwD solution is compared with the following three conventional solutions as baselines: the LUCIR solution, the PODNet solution, and the AANet solution. Further, the average incremental accuracy is used as evaluation metric to evaluate performance. Formally, supposing the CIL is conducted for N+1 phases and test accuracy at the $i^{th}$ phase is $A_i$, then the average increment accuracy is defined as:

$$\overline{A} = \frac{1}{N+1} \sum_{i=0}^{N} A_i \quad \text{Formula 10}$$

The proposed CwD solution is compared with the conventional solutions: the LUCIR solution, the PODNet solution, and the AANet solution. FIG. 9 illustrates an example diagram 900 of comparisons between various solutions according to implementations of the present disclosure. In FIG. 9, the table 910 indicates a comparison of average incremental accuracy (%) with or without the proposed CwD solution at the initial phase. In table 910, B indicates the number of classes learned at initial phase, and S indicates the number of classes learned per phase after the initial one. Here, the number of exemplars for each class is 20. As shown in the table 910, the accuracy levels for the proposed CwD solution (as shown in the shaded lines) are higher than the conventional solutions without CwD, therefore the proposed CwD solution may achieve better technical effects.

Figure 10:
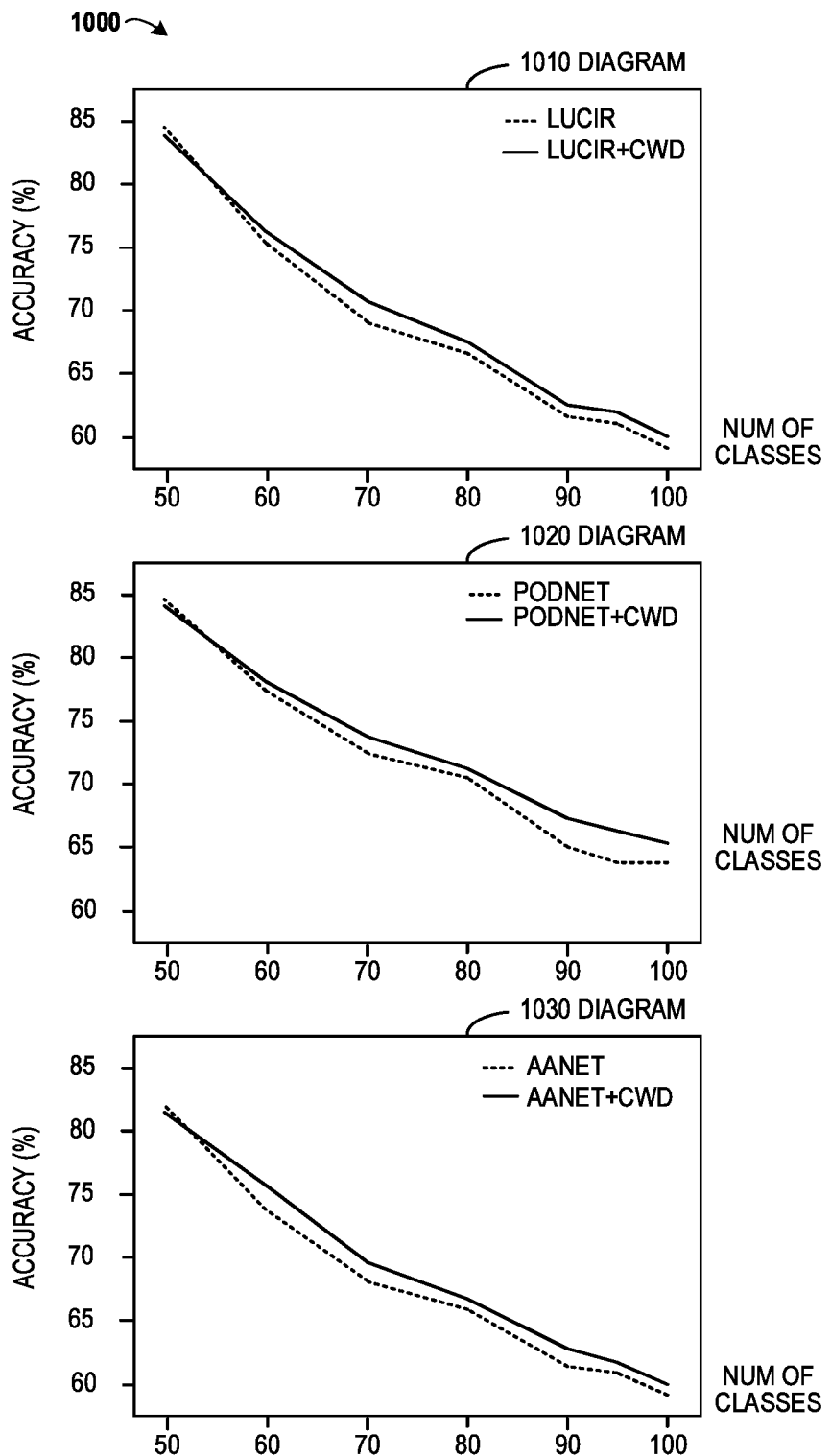
FIG. 10 illustrates an example diagram of comparisons between various conventional solutions and the CwD solution according to implementations of the present disclosure.

FIG. 10 illustrates an example diagram 1000 of comparisons between various solutions according to implementations of the present disclosure. In FIG. 10, the horizontal axis indicates the number of the classes, and the vertical axis indicates the accuracy of the classification model. Here, the diagram 1010 indicates a comparison between the LUCIR solution and the proposed CwD solution when combined with the LUCIR solution, the diagram 1020 indicates a comparison between the PODNet solution and the proposed CwD solution when combined with the PODNet solution, and the diagram 1030 indicates a comparison between the AANet solution and the proposed CwD solution when combined with the AANet solution. From FIG. 10, the accuracy related to the CwD is higher than the conventional solutions.

Further, in the ablation study, statistical data shows that performance of the CwD solution are affected by the following factors: (1) number of classes for the initial phase, (2) number of exemplars, and (3) CwD coefficient ($\eta$ in Formula 9). FIG. 11 illustrates an example diagram 1100 of effects of different factors on the CwD solution according to implementations of the present disclosure. In FIG. 11, the table 1110 indicates effects of number of classes in the initial phase. In the table 1110, B indicates the number of classes at the initial phase, and S indicates the number of classes that are added in each subsequent phase after the initial phase. The data in the last column shows that the accuracy for the proposed CwD solution is higher than the conventional solutions.

Further, the table 1120 shows the number of exemplars. In the table 1120, 50 classes are included in the initial phase, and then the rest of the classes are obtained in the subsequent phases with S classes per phase. The number of exemplars for each class is represented by R. Here, the data in the last column also shows that the accuracy for the proposed CwD solution is higher than the conventional solutions.

FIG. 12 illustrates an example diagram 1200 of effects of weight factors on the CwD solution according to implementations of the present disclosure. In FIG. 12, the horizontal axis indicates CwD coefficient $\eta$, and the vertical axis indicates the accuracy. The diagram 1210 relates to a classification model that is trained with 50 classes, and then 10 classes added in each subsequent phase, and diagram 1220 relates to a classification model that is trained with 50 classes, and then 5 classes added in each subsequent phase. The diagrams 1210 and 1220 show that the CwD coefficient $\eta$ may be configured in a relative wide range, especially the range of [0.25, 0.75] may leads to the better accuracy.

To sum up, the proposed CwD solution may be applied in the CIL procedure, so as to improve the CIL by mimicking the oracle model feature distribution at the initial phase. The proposed CwD solution may achieve consistent and significant performance improvements over the conventional CIL solution. Further, the proposed CwD solution does not greatly increase the computation workload in the initial phase. Instead, the complex problem for scattering the feature distribution is converted into simple mathematical operations by the normalization procedure. Therefore, the classification model may be trained in an effective and easy way, and then the well trained classification model may provide higher accuracy level in the further classification procedure.

Figure 13:
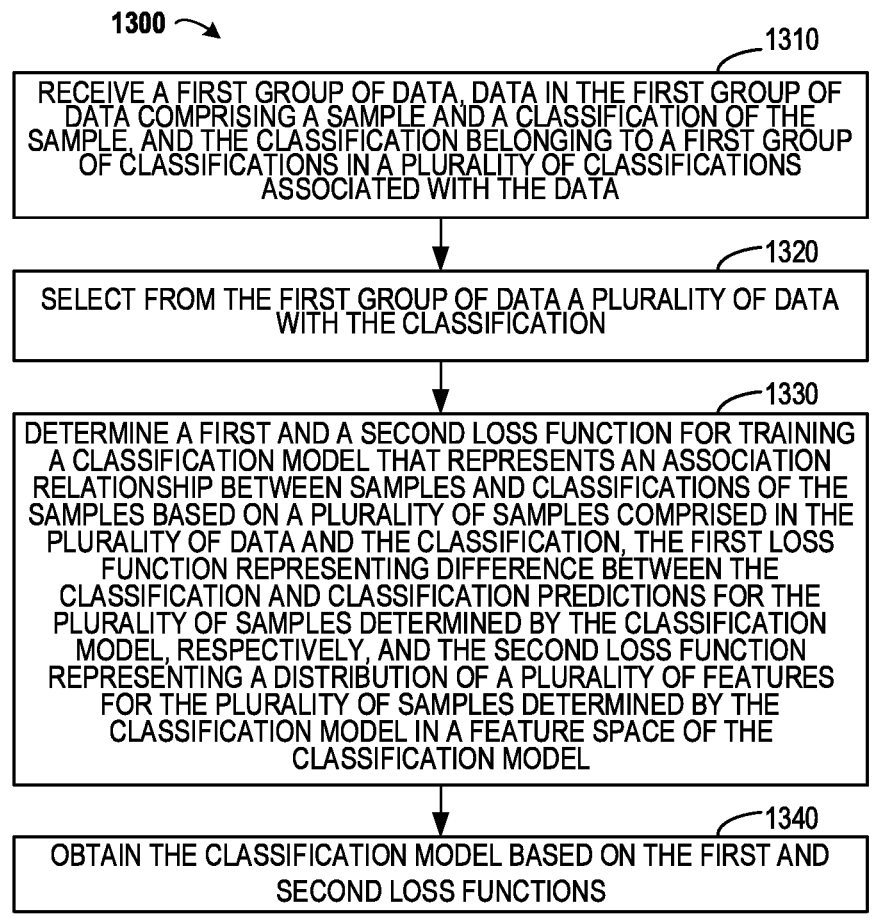
FIG. 13 illustrates an example flowchart of a method for sample classification according to implementations of the present disclosure.

The above paragraphs have described details for the sample processing. According to implementations of the present disclosure, a method is provided for sample processing. Reference will be made to FIG. 13 for more details about the method, here FIG. 13 illustrates an example flowchart of a method 1300 for sample processing based on multiple time windows according to implementations of the present disclosure. At a block 1310, a first group of data are received, here data in the first group of data comprises a sample and a classification of the sample, and the classification belonging to a first group of classifications in a plurality of classifications associated with the data. At a block 1320, a plurality of data with the classification are selected from the first group of data. At a block 1320, a first and a second loss function are determined for training a classification model that represents an association relationship between samples and classifications of the samples based on a plurality of samples comprised in the plurality of data and the classification, the first loss function represents difference between the classification and classification predictions for the plurality of samples determined by the classification model, respectively, and the second loss function represents a distribution of a plurality of features for the plurality of samples determined by the classification model in a feature space of the classification model. The classification model is obtained based on the first and second loss functions.

In implementations of the present disclosure, determining the second loss function comprises: determining the plurality of features for the plurality of samples by the classification model, respectively; determining a correlation relationship among the plurality of features over a plurality of dimensions in the feature space; and determining the second loss function based on the correlation relationship.

In implementations of the present disclosure, determining the correlation relationship comprises: determining a plurality of normalized features for the plurality of features based on a mean and a deviation for the plurality of features, respectively; and determining the correlation relationship based on the plurality of normalized features.

In implementations of the present disclosure, determining the plurality of normalized features comprises: with respect to a feature in the plurality of features, determine a normalized feature for the feature based on the deviation and difference between the feature and the mean.

In implementations of the present disclosure, determining the correlation relationship based on the plurality of normalized features comprises: determining eigenvalues of a covariance matrix for the plurality of normalized features; and determining the correlation relationship based on eigenvalues of the covariance matrix.

In implementations of the present disclosure, determining the eigenvalues comprises: determining a norm for the covariance matrix; and representing the eigenvalues based on the norm and a dimension number of the feature space.

In implementations of the present disclosure, obtaining the classification model further comprises: generating a loss function for training the classification model by weighting the first and second loss functions; and training the classification model based on the loss function.

In implementations of the present disclosure, the method 1300 further comprises: selecting from the first group of data a plurality of data with a further classification in the plurality of classifications; and updating the first and second loss functions based on the plurality of data with the further classification.

In implementations of the present disclosure, the method 1300 further comprises: obtaining a second group of data, data in the second group of data comprising a sample and a classification of the sample, and the classification belonging to a second group of classifications in the plurality of classifications; updating the first and second loss functions based on the second group of data; and updating the classification model based on the updated first and second loss functions.

In implementations of the present disclosure, the sample comprises an image and the classification comprises a label for a content of the image, and obtaining the first group of data comprises obtaining the first group of data during an initial phase in a class incremental learning for training the classification model, obtaining the second group of data comprises obtaining the second group of data during a subsequent phase that follows the initial phase.

According to implementations of the present disclosure, an apparatus is provided for sample processing. The apparatus comprises: a receiving module, being configured for receiving a first group of data, data in the first group of data comprising a sample and a classification of the sample, and the classification belonging to a first group of classifications in a plurality of classifications associated with the data; a selecting module, being configured for selecting from the first group of data a plurality of data with the classification; a determining module, being configured for determining a first and a second loss function for training a classification model that represents an association relationship between samples and classifications of the samples based on a plurality of samples comprised in the plurality of data and the classification, the first loss function representing difference between the classification and classification predictions for the plurality of samples determined by the classification model, respectively, and the second loss function representing a distribution of a plurality of features for the plurality of samples determined by the classification model in a feature space of the classification model; and an obtaining module, being configured for obtaining the classification model based on the first and second loss functions. Further, the apparatus may comprise other units for implementing other steps in the above method.

According to implementations of the present disclosure, an electronic device is provided for implementing the above method. The electronic device comprises: a computer processor coupled to a computer-readable memory unit, the memory unit comprising instructions that when executed by the computer processor implements a method for sample processing. The method comprises: receiving a first group of data, data in the first group of data comprising a sample and a classification of the sample, and the classification belonging to a first group of classifications in a plurality of classifications associated with the data; selecting from the first group of data a plurality of data with the classification; determining a first and a second loss function for training a classification model that represents an association relationship between samples and classifications of the samples based on a plurality of samples comprised in the plurality of data and the classification, the first loss function representing difference between the classification and classification predictions for the plurality of samples determined by the classification model, respectively, and the second loss function representing a distribution of a plurality of features for the plurality of samples determined by the classification model in a feature space of the classification model; and obtaining the classification model based on the first and second loss functions.

In implementations of the present disclosure, determining the second loss function comprises: determining the plurality of features for the plurality of samples by the classification model, respectively; determining a correlation relationship among the plurality of features over a plurality of dimensions in the feature space; and determining the second loss function based on the correlation relationship.

In implementations of the present disclosure, determining the correlation relationship comprises: determining a plurality of normalized features for the plurality of features based on a mean and a deviation for the plurality of features, respectively; and determining the correlation relationship based on the plurality of normalized features.

In implementations of the present disclosure, determining the plurality of normalized features comprises: with respect to a feature in the plurality of features, determine a normalized feature for the feature based on the deviation and difference between the feature and the mean.

In implementations of the present disclosure, determining the correlation relationship based on the plurality of normalized features comprises: determining eigenvalues of a covariance matrix for the plurality of normalized features; and determining the correlation relationship based on eigenvalues of the covariance matrix.

In implementations of the present disclosure, determining the eigenvalues comprises:
determining a norm for the covariance matrix; and representing the eigenvalues based on the norm and a dimension number of the feature space.

In implementations of the present disclosure, obtaining the classification model further comprises: generating a loss function for training the classification model by weighting the first and second loss functions; and training the classification model based on the loss function.

In implementations of the present disclosure, the method further comprises: selecting from the first group of data a plurality of data with a further classification in the plurality of classifications; and updating the first and second loss functions based on the plurality of data with the further classification.

In implementations of the present disclosure, the method further comprises: obtaining a second group of data, data in the second group of data comprising a sample and a classification of the sample, and the classification belonging to a second group of classifications in the plurality of classifications; updating the first and second loss functions based on the second group of data; and updating the classification model based on the updated first and second loss functions.

In implementations of the present disclosure, the sample comprise an image and the classification comprise a label for a content of the image, obtaining the first group of data comprises obtaining the first group of data during an initial phase in a class incremental learning for training the classification model, obtaining the second group of data comprises obtaining the second group of data during a subsequent phase that follows the initial phase.

According to implementations of the present disclosure, a computer program product, the computer program product comprising a computer readable storage medium having program instructions embodied therewith, the program instructions executable by an electronic device to cause the electronic device to perform the method 1300.

Figure 14:
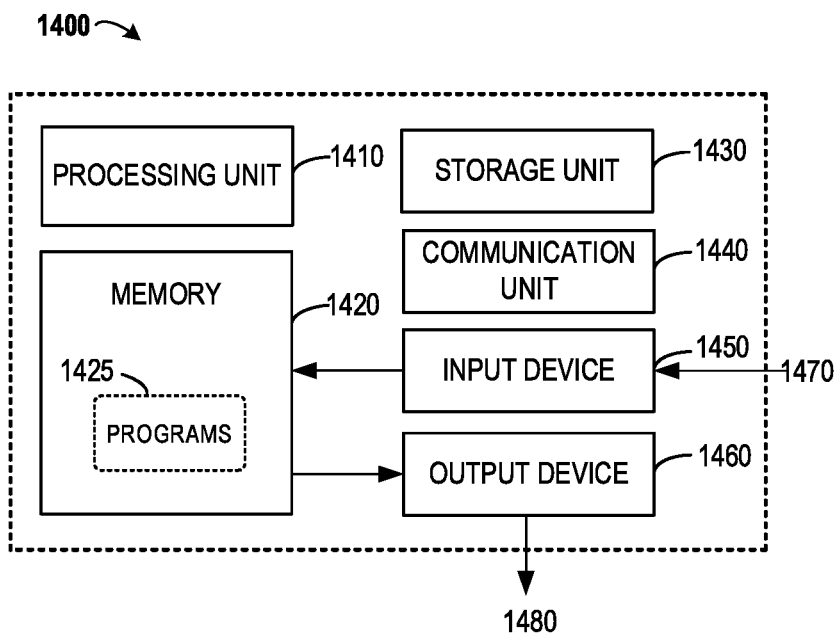
FIG. 14 illustrates a block diagram of a computing device in which various implementations of the present disclosure can be implemented.

FIG. 14 illustrates a block diagram of a computing device 1400 in which various implementations of the present disclosure can be implemented. It would be appreciated that the computing device 1400 shown in FIG. 14 is merely for purpose of illustration, without suggesting any limitation to the functions and scopes of the present disclosure in any manner. The computing device 1400 may be used to implement the above method 1400 in implementations of the present disclosure. As shown in FIG. 14, the computing device 1400 may be a general-purpose computing device. The computing device 1400 may at least comprise one or more processors or processing units 1410, a memory 1420, a storage unit 1430, one or more communication units 1440, one or more input devices 1450, and one or more output devices 1460.

The processing unit 1410 may be a physical or virtual processor and can implement various processes based on programs stored in the memory 1420. In a multi-processor system, multiple processing units execute computer executable instructions in parallel so as to improve the parallel processing capability of the computing device 1400. The processing unit 1410 may also be referred to as a central processing unit (CPU), a microprocessor, a controller, or a microcontroller.

The computing device 1400 typically includes various computer storage medium. Such medium can be any medium accessible by the computing device 1400, including, but not limited to, volatile and non-volatile medium, or detachable and non-detachable medium. The memory 1420 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 1430 may be any detachable or non-detachable medium and may include a machine-readable medium such as a memory, flash memory drive, magnetic disk, or another other media, which can be used for storing information and/or data and can be accessed in the computing device 1400.

The computing device 1400 may further include additional detachable/non-detachable, volatile/non-volatile memory medium. Although not shown in FIG. 14, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 1440 communicates with a further computing device via the communication medium. In addition, the functions of the components in the computing device 1400 can be implemented by a single computing cluster or multiple computing machines that can communicate via communication connections. Therefore, the computing device 1400 can operate in a networked environment using a logical connection with one or more other servers, networked personal computers (PCs) or further general network nodes.

The input device 1450 may be one or more of a variety of input devices, such as a mouse, keyboard, tracking ball, voice-input device, and the like. The output device 1460 may be one or more of a variety of output devices, such as a display, loudspeaker, printer, and the like. By means of the communication unit 1440, the computing device 1400 can further communicate with one or more external devices (not shown) such as the storage devices and display device, with one or more devices enabling the user to interact with the computing device 1400, or any devices (such as a network card, a modem, and the like) enabling the computing device 1400 to communicate with one or more other computing devices, if required. Such communication can be performed via input/output (I/O) interfaces (not shown).

In some implementations, instead of being integrated in a single device, some, or all components of the computing device 1400 may also be arranged in cloud computing architecture. In the cloud computing architecture, the components may be provided remotely and work together to implement the functionalities described in the present disclosure. In some implementations, cloud computing provides computing, software, data access and storage service, which will not require end users to be aware of the physical locations or configurations of the systems or hardware providing these services. In various implementations, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The functionalities described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out the methods of the subject matter described herein may be written in any combination of one or more programming languages. The program code may be provided to a processor or controller of a general-purpose computer, special purpose computer, or other programmable data processing apparatus such that the program code, when executed by the processor or controller, causes the functions/operations specified in the flowcharts and/or block diagrams to be implemented. The program code may be executed entirely or partly on a machine, executed as a stand-alone software package partly on the machine, partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are illustrated in a particular order, this should not be understood as requiring that such operations are performed in the particular order shown or in sequential order, or that all illustrated operations are performed to achieve the desired results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Rather, various features described in a single implementation may also be implemented in multiple implementations separately or in any suitable subcombination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

From the foregoing, it will be appreciated that specific implementations of the presently disclosed technology have been described herein for purposes of illustration, but that various modifications may be made without deviating from the scope of the disclosure. Accordingly, the presently disclosed technology is not limited except as by the appended claims.

Implementations of the subject matter and the functional operations described in the present disclosure can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media, and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While the present disclosure contains many specifics, these should not be construed as limitations on the scope of any disclosure or of what may be claimed, but rather as descriptions of features that may be specific to particular implementations of particular disclosures. Certain features that are described in the present disclosure in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are illustrated in the drawings in a particular order, this should not be understood as requiring that such operations be performed in the particular order shown or in sequential order, or that all illustrated operations be performed, to achieve desirable results. Moreover, the separation of various system components in the implementations described in the present disclosure should not be understood as requiring such separation in all implementations. Only a few implementations and examples are described and other implementations, enhancements and variations can be made based on what is described and illustrated in the present disclosure.

What is claimed is:

1. A method for sample classification, comprising:
   receiving a first group of data, the first group of data comprising samples and classifications of the samples, the classifications belonging to a first group of classifications in a plurality of classifications;
   selecting from the first group of data a subset group of data, the subset group of data comprising a plurality of samples and classifications of the plurality of samples;
   determining a first loss function and a second loss function for training a classification model, wherein the classification model is trained based on the plurality of samples and the classifications comprised in the subset group of data, the first loss function representing difference between the classifications and classification predictions for the plurality of samples determined by the classification model, and the second loss function representing a distribution of a plurality of features determined by the classification model in a feature space of the classification model, wherein the plurality of features comprise variables generated by the classification model based on encoding the plurality of samples into the feature space of the classification model, and wherein the plurality of features are utilized to train the classification model to generate the classification predictions for the plurality of samples; and
   obtaining the classification model based on the first loss function and the second loss function.

2. The method of claim 1, wherein determining the second loss function comprises:
   determining the plurality of features based on encoding the plurality of samples into the feature space by the classification model;
   determining a correlation relationship among the plurality of features over a plurality of dimensions in the feature space; and
   determining the second loss function based on the correlation relationship.

3. The method of claim 2, wherein determining the correlation relationship comprises:
   determining a plurality of normalized features for the plurality of features based on a mean and a deviation for the plurality of features, respectively; and
   determining the correlation relationship based on the plurality of normalized features.

4. The method of claim 3, wherein determining the plurality of normalized features comprises: with respect to a feature in the plurality of features,
   determine a normalized feature for the feature based on the deviation and difference between the feature and the mean.

5. The method of claim 3, wherein determining the correlation relationship based on the plurality of normalized features comprises:
   determining eigenvalues of a covariance matrix for the plurality of normalized features; and
   determining the correlation relationship based on eigenvalues of the covariance matrix.

6. The method of claim 5, wherein determining the eigenvalues comprises:
   determining a norm for the covariance matrix; and
   representing the eigenvalues based on the norm and a dimension number of the feature space.

7. The method of claim 1, wherein obtaining the classification model further comprises:
   generating a loss function for training the classification model by weighting the first loss function and the second loss function; and
   training the classification model based on the loss function.

8. The method of claim 1, further comprising:
   selecting from the first group of data a plurality of data with a further classification in the plurality of classifications; and
   updating the first and second loss functions based on the plurality of data with the further classification.

9. The method of claim 1, further comprising:
   obtaining a second group of data, the second group of data comprising samples and classifications of the samples, the classifications belonging to a second group of classifications in the plurality of classifications;
updating the first and second loss functions based on the second group of data; and
updating the classification model based on the updated first and second loss functions.

10. The method of claim 9, wherein the sample comprises an image and the classification comprises a label for a content of the image,
wherein receiving the first group of data comprises obtaining the first group of data during an initial phase in a class incremental learning for training the classification model, and wherein obtaining the second group of data comprises obtaining the second group of data during a subsequent phase that follows the initial phase.

11. An electronic device, comprising a computer processor coupled to a computer-readable memory unit, the memory unit comprising instructions that when executed by the computer processor implements a method for sample processing, comprising:
receiving a first group of data, the first group of data comprising samples and classifications of the samples, the classifications belonging to a first group of classifications in a plurality of classifications;
selecting from the first group of data a subset group of data, the subset group of data comprising a plurality of samples and classifications of the plurality of samples;
determining a first loss function and a second loss function for training a classification model, wherein the classification model is trained based on the plurality of samples and the classifications comprised in the subset group of data, the first loss function representing difference between the classifications and classification predictions for the plurality of samples determined by the classification model, and the second loss function representing a distribution of a plurality of features determined by the classification model in a feature space of the classification model, wherein the plurality of features comprise variables generated by the classification model based on encoding the plurality of samples into the feature space of the classification model, and wherein the plurality of features are utilized to train the classification model to generate the classification predictions for the plurality of samples; and
obtaining the classification model based on the first loss function and the second loss function.

12. The device of claim 11, wherein determining the second loss function comprises:
determining the plurality of features based on encoding the plurality of samples into the feature space by the classification model;
determining a correlation relationship among the plurality of features over a plurality of dimensions in the feature space; and
determining the second loss function based on the correlation relationship.

13. The device of claim 12, wherein determining the correlation relationship comprises:
determining a plurality of normalized features for the plurality of features based on a mean and a deviation for the plurality of features, respectively; and
determining the correlation relationship based on the plurality of normalized features.

14. The device of claim 13, wherein determining the plurality of normalized features comprises: with respect to a feature in the plurality of features,
determine a normalized feature for the feature based on the deviation and difference between the feature and the mean.

15. The device of claim 13, wherein determining the correlation relationship based on the plurality of normalized features comprises:
determining eigenvalues of a covariance matrix for the plurality of normalized features; and
determining the correlation relationship based on eigenvalues of the covariance matrix.

16. The device of claim 15, wherein determining the eigenvalues comprises:
determining a norm for the covariance matrix; and
representing the eigenvalues based on the norm and a dimension number of the feature space.

17. The device of claim 11, wherein the method further comprising:
selecting from the first group of data a plurality of data with a further classification in the plurality of classifications; and
updating the first and second loss functions based on the plurality of data with the further classification.

18. The device of claim 11, wherein the method further comprising:
obtaining a second group of data, the second group of data comprising samples and classifications of the samples, the classifications belonging to a second group of classifications in the plurality of classifications;
updating the first and second loss functions based on the second group of data; and
updating the classification model based on the updated first and second loss functions.

19. The device of claim 18, wherein the sample comprises an image and the classification comprises a label for a content of the image,
wherein receiving the first group of data comprises obtaining the first group of data during an initial phase in a class incremental learning for training the classification model, and wherein obtaining the second group of data comprises obtaining the second group of data during a subsequent phase that follows the initial phase.

20. A computer program product, the computer program product comprising a computer readable storage medium having program instructions embodied therewith, the program instructions executable by an electronic device to cause the electronic device to perform a method for sample processing, the method comprises:
receiving a first group of data, the first group of data comprising samples and classifications of the samples, the classifications belonging to a first group of classifications in a plurality of classifications;
selecting from the first group of data a subset group of data, the subset group of data comprising a plurality of samples and classifications of the plurality of samples;
determining a first loss function and a second loss function for training a classification model, wherein the classification model is trained based on the plurality of samples and the classifications comprised in the subset group of data, the first loss function representing difference between the classifications and classification predictions for the plurality of samples determined by the classification model, and the second loss function representing a distribution of a plurality of features determined by the classification model in a feature space of the classification model, wherein the plurality of features comprise variables generated by the classification model based on encoding the plurality of samples into the feature space of the classification model, and wherein the plurality of features are utilized to train the classification model to generate the classification predictions for the plurality of samples; and obtaining the classification model based on the first loss function and the second loss function.

* * * * *